United States Patent [19]

Einolf, Jr. et al.

[11] Patent Number: 4,899,383

[45] Date of Patent: Feb. 6, 1990

[54] APPARATUS AND METHOD FOR SECURE DIGITAL COMMUNICATION

[75] Inventors: Charles W. Einolf, Jr., Murrysville; Harold B. Shutterly, Edgewood Boro, both of Pa.; Shan C. Sun, Coral Springs, Fla.; Russel W. Gonnam, Coral Springs, Fla.; Roger E. Ray, Coral Springs, Fla.; Karl C. Koch, Pittsburgh; Pamela M. Maynard-Nenno, Wilkins Township, Allegheny County, both of Pa.

[73] Assignee: Westinghouse Electric Corp., Pittsburgh, Pa.

[21] Appl. No.: 94,186

[22] Filed: Sep. 8, 1987

[51] Int. Cl.$^4$ .............................................. H04L 7/08
[52] U.S. Cl. ....................................... 380/48; 380/50; 375/114; 375/116; 370/105
[58] Field of Search ............... 380/48, 50, 9; 375/114, 375/116; 370/105

[56] References Cited

U.S. PATENT DOCUMENTS

| | | | |
|---|---|---|---|
| 4,316,285 | 2/1982 | Bobilin et al. | 370/105 |
| 4,347,606 | 8/1982 | Hoogeveen | 370/105 |
| 4,390,986 | 6/1983 | Moses | 370/105 |
| 4,404,542 | 9/1983 | Thomas, Jr. | 375/116 |
| 4,622,666 | 11/1986 | Graves et al. | 370/105 |
| 4,646,329 | 2/1987 | Bojarski | 375/114 |
| 4,727,558 | 2/1988 | Hall | 375/116 |

FOREIGN PATENT DOCUMENTS 0159933  7/1987  Japan .................................. 370/105

Primary Examiner—Salvatore Cangialosi
Assistant Examiner—David Cain
Attorney, Agent, or Firm—B. R. Studebaker

[57] ABSTRACT

The multiplexer in a multichannel, secure digital communication system repetitively embeds a sequence of byte length uniquely coded synchronizing signals in each of n successive frames of one channel of a multichannel, time multiplexed digital bit stream. Redundant protective relay data and associated parity check data are embedded in four of the n frames in a second, preferably adjacent channel, with the remaining of the n frames in the second channel containing additional of the uniquely coded synchronizing signals. The time multiplexed serial bit stream is transmitted to a remote station, preferably by fiber optic communications media. The most recent bits of the received serial bit stream equal in number to the number of bits spanned by the two channels in n frames are retained in n−1 serially connected serial in, serial out shift registers. Sixteen bit portions, a frame apart, of the retained most recent bits of the serial bit stream are applied to n serial in, parallel out shift registers. The parallel outputs of these shift registers corresponding to the frames of the two channels encoded with the synchronizing signals are compared with the sequence of uniquely coded signals stored in addresses in PROMs. When the compared signals match, which will occur once in every n frames, a synchronization signal is generated and the protective relay data and parity check data are read directly from the other parallel outputs of the serial in, parallel out shift registers. Similar rapid resynchronization of voice and data channels in the time multiplexed serial bit stream can be achieved by counting the number of bits in the bit stream from the generation of the synchronization signal in the relay protection channels to the beginning of the time slot for a selected voice or data channel.

28 Claims, 6 Drawing Sheets

APPARATUS AND METHOD FOR SECURE DIGITAL COMMUNICATION

BACKGROUND OF THE INVENTION

1. Field of the Invention

This invention relates to apparatus and methods for digital time multiplexed communication. More particularly, it relates to apparatus and methods for transmitting protective relaying information and includes devices and techniques which enhance the security of such communications by assuring rapid re-synchronization if the signal is interrupted. The invention also concerns such communications in which voice and/or other data are transmitted in the same time multiplexed signal as the relaying information.

2. Background Information

Electric utilities incorporate monitoring and protective relaying equipment into their power systems in order to insure reliable operation and maximum availability. Frequently this equipment must communicate with similar equipment at the ends of long transmission lines. The means of communication is traditionally either microwave or telephone links. Unfortunately, microwave links are susceptible to various environmental conditions such as rain, snow, and fog. Conventional telephone links over either switched or non-switched networks do not meet the reliability and availability requirements for protective relaying. Conventional telephone communication systems such as T1 or T3 networks have not been designed for secure operation and are unable to provide rapid re-synchronization during periods of signal loss.

In a T1 telecommunication system, bytes of data from 24 channels are time multiplexed into a serial bit stream. The bit stream is divided into a sequence of frames, each consisting of one synchronizing bit followed by a byte of data from each channel (193 bits per frame). The synchronizing bits in each group of 12 frames, known as a superframe, are encoded in a unique sequence. The sequence, repeated continuously, is used to synchronize T1 decoders. In an extended frame format, only one bit for four frames is used, and the unique six bit sequence repeats every 24 frames.

Data bytes from any one channel are separated in the T1 format by 23 bytes of data from the other channels. As a result, when the bit stream is demultiplexed at a receiver, synchronization errors can cause channels to be cross-connected, or data from different channels to be intermixed. To prevent the gross effects which could result from such data mixing, the data to all channels is latched and held fixed during periods when synchronization errors are detected at a receiver.

The single bit per frame provided for synchronization in the T1 format is sufficient for maintaining synchronization once it is established, but it does not facilitate rapid re-synchronization when interruption of data reception occurs. In re-synchronizing, there are 193 bit positions in which the lost synchronizing sequence can occur. In searching for the synchronizing sequence, false indications can easily occur since the channel data is unconstrained. Consequently, several repetitions of the sequence at a particular bit position are required before synchronization is assured.

At the T1 data rate, 12 frames are received in 1.5 milliseconds, and three repetitions of the synchronizing sequence therefore require a minimum of 4.5 milliseconds. The actual time required to re-synchronize is a variable which depends on three factors: (1) the number of bit positions that are searched simultaneously (equipment complexity), (2) the number of false indications that happen to occur in the channel data, and (3) the number of positions that must be searched before the correct position happens to be located.

For a protective relay data channel, the maximum re-synchronization time has been specified as two milliseconds. The standard T1 system is therefore unacceptable, and a special synchronizing arrangement is required.

In addition to the above, the communications capability of conventional telephone systems such as T1, or microwave networks, is severely underutilized when dedicated to a single protective relaying application. There is a need therefore for a communication network which can be utilized to its full capability while providing the security necessary for protective relaying.

Accordingly, it is a primary object to the invention to provide apparatus and a method for secure relaying communication.

A broader object of the invention is provide a method and apparatus for rapid re-synchronization of a time multiplexed communication signal if synchronization is lost.

It is another important object of the invention to provide a method and apparatus which realizes the previous objects while providing full utilization of the communication system capability.

It is a more specific object of the invention to provide a method and apparatus which satisfies the above objects while using a standard T1 format.

SUMMARY OF THE INVENTION

These and other objects are realized by the invention in which a secure digital communication system includes means for time multiplexing a plurality of channels to form a serial bit stream comprising successive frames with each frame containing a fixed number of bits, such as for example a byte, from each channel. The serial bit stream is encoded by repetitively inserting in the fixed number of bits for a selected channel in each of n successive frames, one of a sequence of separate uniquely coded signals. The encoded serial bit stream is transmitted to a remote location where the most recent bits, equal in number to the number of bits spanned by the selected channel in n frames, are continuously retained. Sequential fixed number of bit portions of the retained bit stream spaced apart by the length of a frame are compared with stored values of the sequence of uniquely coded signal. When the sequential fixed number of bit portions of the received bit stream generate a selected match with stored values of the sequence of uniquely coded signals, a synchronization signal is generated. The synchronization signal is used for demultiplexing the received signal.

The most recent bits of the serial bit stream are retained in a series of serially connected serial in, serial out shift registers. The sequential fixed number of bit portions of the retained bit stream are compared to the sequence of the uniquely coded signals utilizing a number of serial in, parallel out shift registers into which specified bits from the serial in, serial out shift registers spaced apart by the number of bits in a frame are entered. The parallel outputs of the serial in, parallel out shift registers are then compared with the stored values of the sequence of uniquely coded signals. In the exemplary system, n−1 serial in, serial out shifts registers and n serial in, parallel out shift registers are used where n is the number of successive frames which are encoded with the sequence of uniquely coded signals.

In the preferred form of the invention, the comparison between the specified bits of the received serial bit stream and the stored coded signals is made using programmable memory means programmed with addresses corresponding to each of the uniquely coded signals. The parallel outputs of the serial in, parallel out shift registers are applied to the programmable memory means as addresses so that when the bits of the received signal in the specified bits of the serial in serial out shift registers equal the addresses of the uniquely encoded signals a synchronization signal is generated.

More than one channel can be encoded with the uniquely coded signals which are compared with stored values in the receiver to determine a match. The more channels that are so encoded reduces the number of frames required to reliably synchronize the signal, however it reduces the data content of the signal.

The invention is especially suitable for a protective relaying system. In this application, the relaying information can be embedded in some of the frames of a channel which is encoded with uniquely coded synchronizing signals. In the preferred form of this embodiment, redundant relaying data, together with check signals, such as parity checks, are embedded in one of the channels encoded with the coded synchronizing signals. With this arrangement, the data and check signals can be extracted from the serial bit stream at the instant that a match is detected between the encoded signal received and the stored values of the coded signals.

As applied to a protective relaying system, full utilization of the system is achieved by transmitting voice, and or digital data, on other channels of the multichannel system. The same rapid synchronization of the other channels can be achieved by a counter which is preloaded by the protection and synchronization channel synchronization signal to the number of bits between the synchronization signal and the beginning of a selected voice or data channel. The output of this counter is used by a conventional decoding device to convert the serial data into an analog voice channel or digital data channel output as appropriate.

The invention embraces both the novel method and apparatus for secure digital communication.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to a secure relaying communications system implemented using fiber optics as the communications media to maximize the reliability of the system. However, the invention can provide substantial improvements for both metallic and radiated energy communication systems such as microwave or radio frequency.

Figure 1:
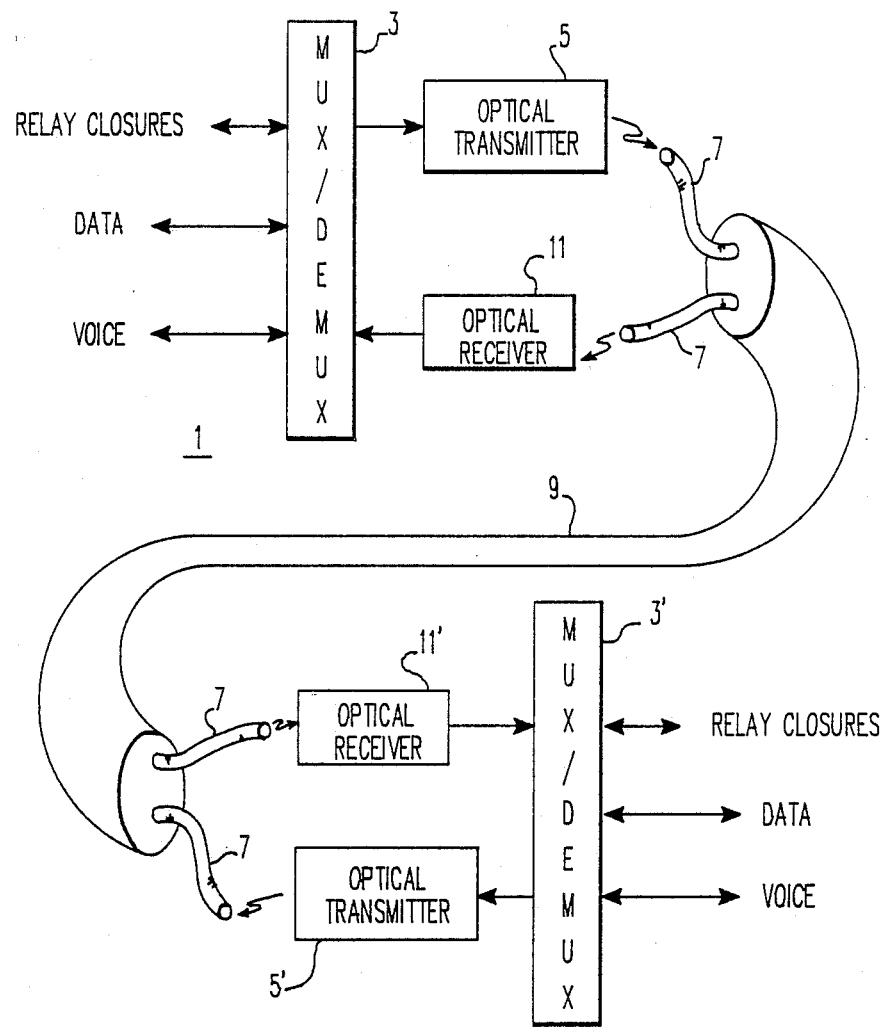
FIG. 1 is a block diagram of a secure relaying communications system incorporating the invention.

As shown in FIG. 1, the exemplary system 1 receives for transmission various electrical inputs such a voice signals, e.g., telephone communications, data, e.g. computer communications, and relay closures, e.g., protective relaying and control signals. Such a system has practical application in the utility field. The relaying data is used by protection devices installed, for instance, along a power transmission line. Since these devices must exchange information the system is bidirectional.

The relay closure signals and the data signals are digital signals. The voice signals are converted to digital signals utilizing conventional equipment not shown. The digital signals are applied to a multiplexer/demultiplexer 3 which time multiplexes outgoing signals and demultiplexes incoming signals. The time multiplexed signal is applied to an optical transmitter 5 which converts the electrical pulse signal to an optical pulse signal for transmission over one of the optic fiber channels 7 in a fiber optic cable 9. At the receiving station 3', the digital optical signal is converted by an optical receiver 11 back to a digital electric signal and is demultiplexed by the multiplexer/demultiplexer 5'.

The exemplary system utilizes the T1 format in order that the apparatus can operate within existing standards and fully utilize existing electronic components in its implementation. However, the system is not confined to the T1 standards, but can be implemented using other standards, such as for example, CEPT, DS3 and others. As applied to a system utilizing the T1 format, bytes of data from 24 channels are time multiplexed into a serial bit stream. The serial bit stream is divided into frames with each frame including a byte of data from each channel and a single synchronizing bit. The T1 synchronizing bit is not used by the present invention. Instead, the invention introduces a new method of message synchronization in order to assure rapid re-synchronization under adverse conditions.

Figure 2:
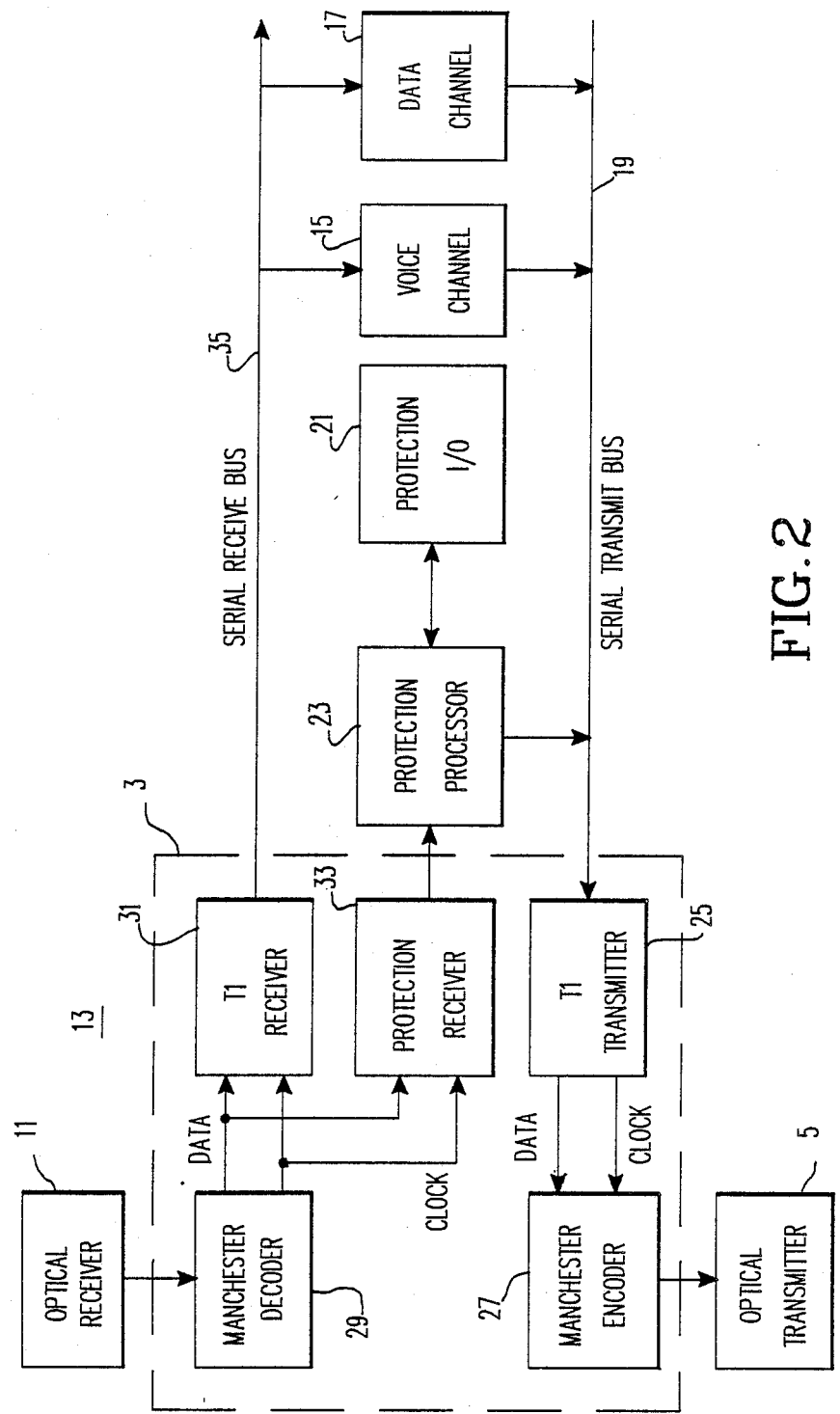
FIG. 2 is a block diagram of a more secure portion of the secure relaying communication system of FIG. 1.

A more detailed block diagram of a station 13 of the communication system of FIG. 1 is shown in FIG. 2. The voice channels 15 and data channels 17 provide signals to be transmitted to the multiplexer/demultiplexer 3 on a serial transmit bus 19. A protection system input/output board 21 passes relaying and control system relay closure inputs to a protection processor 23 which applies logic to the inputs in a known manner and generates relay and control signals for transmission on the serial transmit bus 19.

The multiplexer/demultiplexer 3 includes a conventional T1 transmitter 25 which encodes the various signals received on the serial transmit bus 19 into the T1 format. The T1 transmitter passes the serial data along with clock pulses to a conventional Manchester encoder 27 which integrates the data signals and clock pulses using the Manchester protocol in a well known manner. The Manchester encoded serial bit stream is then converted into a pulsed optical signal by optical transmitter 5 for transmission through optical fiber 7.

At the receiving station, the electrical pulse signal generated by the optical receiver 11 is applied to a Manchester decoder 29 within the multiplexer/demultiplexer 3. The Manchester decoder 29 separates the data and clock signals and applies each of them to a conventional T1 receiver 31 and to a protection receiver 33. The T1 receiver 31 is a conventional decoder which demultiplexes the channels of the T1 signal. In the exemplary system, T1 receiver 31 is only used to decode the voice and data channels. The appropriate signals are transmitted on serial receive bus 35 to the voice channel 15 and data channel 17.

The protection receiver 33 provides the rapid synchronization required of the protection data transmitted in the T1 signal. It also extracts the data and accompanying check signals from the received time multiplexed signal and verifies and corrects the data utilizing known techniques. The verified and corrected data is then transmitted to the protection processor 23 which passes logic signals to the protection input/output board 21 to operate output contacts in accordance with the transmitted data.

As was discussed previously, the time required for re-synchronization of a T1 signal does not meet the requirements for a protective relaying system in applications where the maximum re-synchronization time has been specified for instance as two milliseconds. The basic problem in synchronizing T1 data is that of distinguishing the periodic synchronizing sequence from the channel data in which it is embedded. The channel data can include any possible sequence, but the probability that a particular sequence will occur in the data decreases with the length of the sequence. This assumes that the data can be represented reasonable well by a random sequence. The ability to synchronize the decoder quickly, therefore, depends upon the use of a format in which long synchronization sequences are received at frequent intervals.

A format in accordance with the invention that can be used for synchronizing relay protection data is as follows:

CHANNEL 1: S1 S3 S5 S6 S7 S8
CHANNEL 2: S2 S4 D1 D2 P1 P2

This format is embedded in the conventional T1 signal. Two T1 channels are used solely for relay protection data and synchronization. S1 to S8 represent a sequence of 8, byte length uniquely encoded synchronization signals. D1 and D2 are redundant copies of the protection data to be transmitted, each one byte in length. P1 and P2 are parity check bytes for the data D1 and D2 respectively. As can be seen, channel 1 transmits only synchronization data, one byte per T1 frame, repeating every 6 frames. Channel 2 transmits, in sequence: two bytes of synchronizing data, S2 and S4, two bytes of protection data, D1 and D2, and two bytes of parity check data, P1 and P2.

Figure 3:
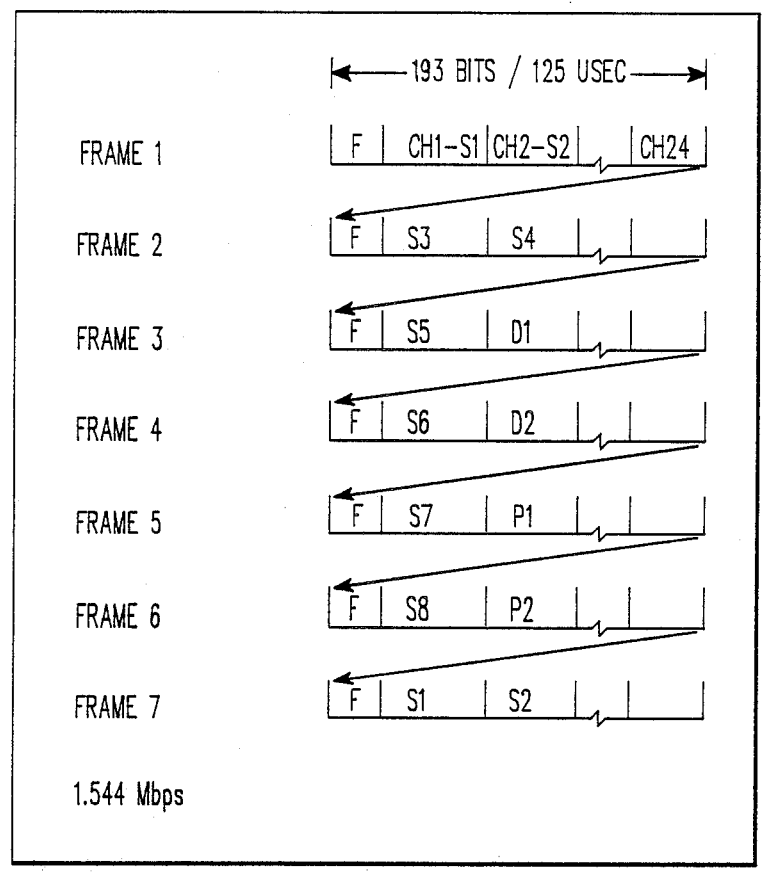
FIG. 3 is a diagram illustrating the format of the signal generated by the exemplary system.

The manner in which the synchronization, protection data and parity check data is embedded in the T1 format is illustrated in FIG. 3. As shown there, each frame includes a framing bit, F, followed by a byte from each of 24 channels, CH1 to CH24. Thus, each frame contains 193 bits, one for the framing bit and eight bits for each of the 24 channels. The frames are transmitted serially to produce a serial bit stream in which data from each channel is transmitted in sequence every 193 bits. Thus, the uniquely encoded synchronization signals S1 to S8 are transmitted in time sequence. Two adjacent channels, for instance channels 1 and 2, are used in the exemplary system so that the protection and synchronizing data appears in continuous 16-bit sequences as data from channels 1 and 2 are serially transmitted in each frame. To obtain synchronization, the protection receiver looks for the two-byte sequence S1, S2 and then for S3, S4 which must occur 193 bytes after the beginning of S1 if the proper sequence has been detected. Then at successive 193-bit intervals S5, S6, S7, S8 must be found in order to confirm proper synchronization. The system as described can utilize any two consecutive channels. However, the system can be reconfigured to utilize any two channels, or for that matter, any number of channels, adjacent or otherwise.

The T1 signal is transmitted at 1.544 megabits per second (Mbps). Thus 125 microseconds is required to transmit each frame and 750 microseconds is required to transmit the sequence of 6 coded frames. The complete coded sequence is repeated every 750 microseconds.

Figure 4:
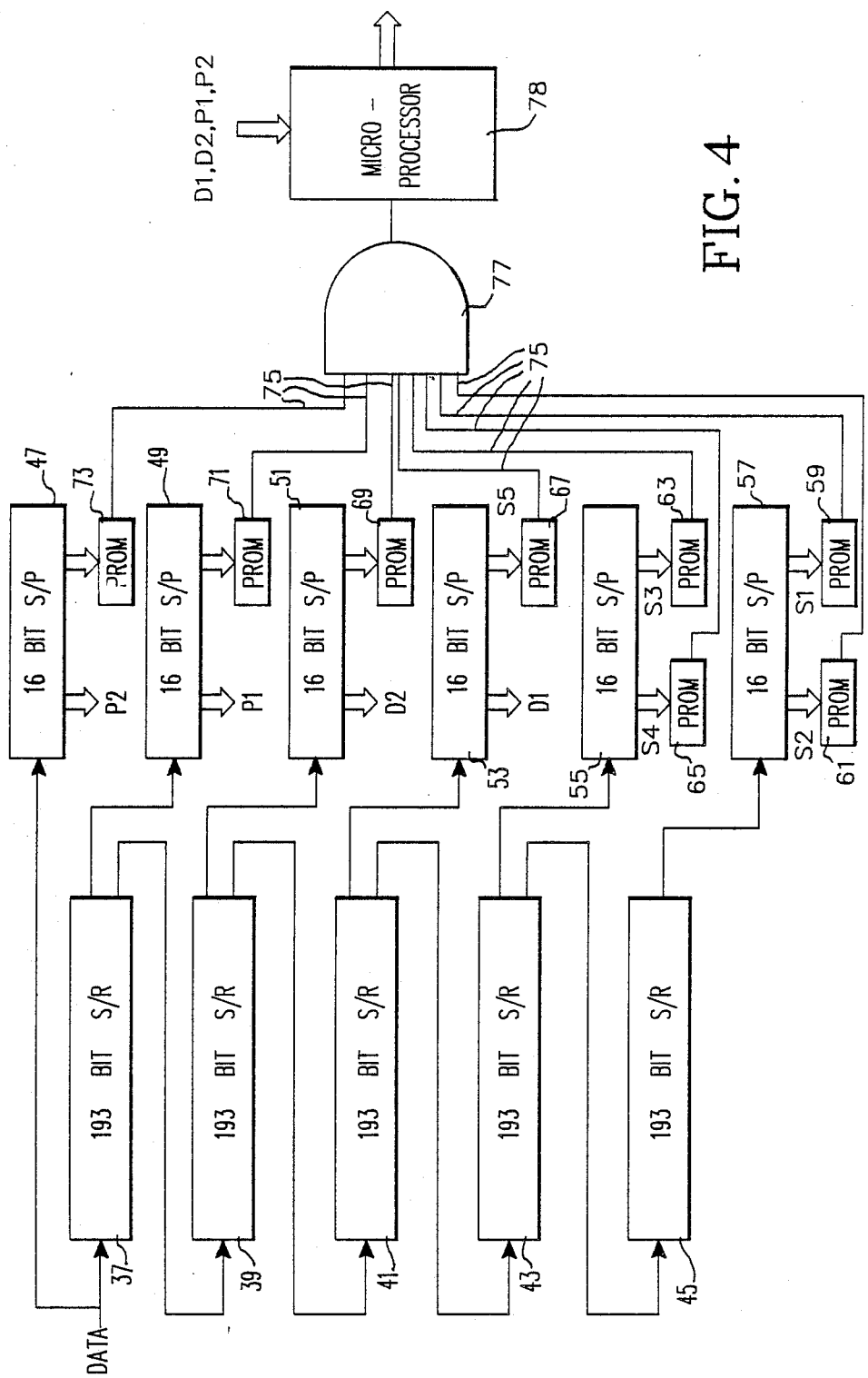
FIG. 4 is a block diagram of the protection receiver which forms a portion of the system shown in FIG. 2.
Figure 5:
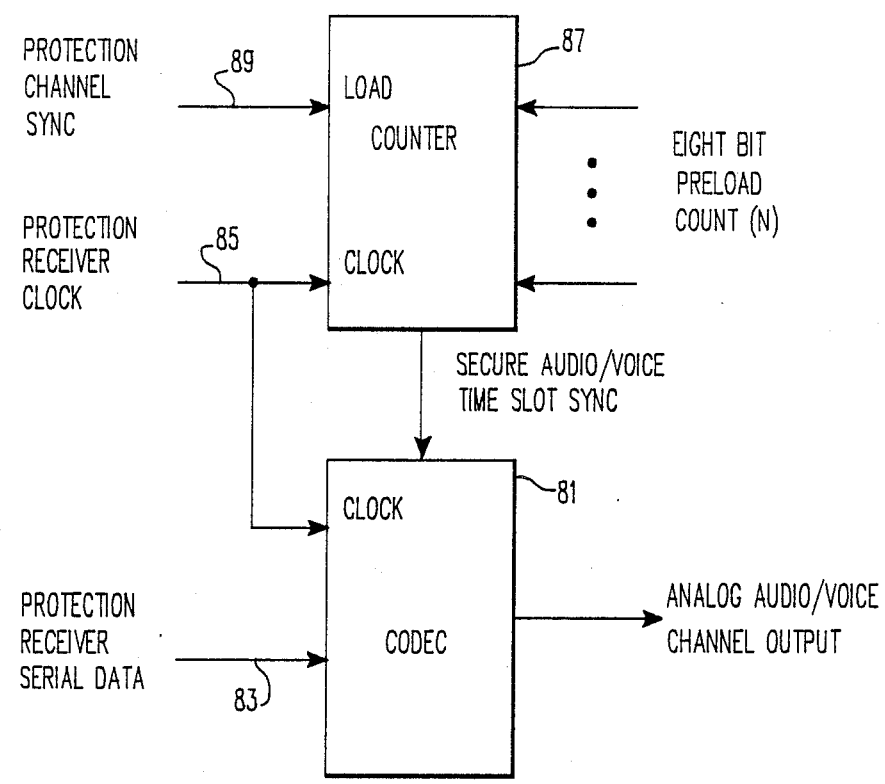
FIG. 5 is a block diagram of a modification of the system of FIG. 2 in accordance with another aspect of the invention.

The portion of the protection receiver 33 for synchronizing the received serial bit stream and extracting the relaying message and parity checks is shown in FIG. 4. Serial in, serial out, 193 bit shift registers 37, 39, 41, 43 and 45 are serially connected to receive the transmitted serial bit stream. These serial in, serial out shift registers continuously retain the most recent bits of the received signal.

Five of six 16-bit serial in, parallel out shift registers 49, 51, 53, 55, and 57 are connected to receive the serial output of one of the serial in, serial out shift registers. The sixth serial in parallel out register 47 receives the beginning of the data stream which is applied to the serial in, serial out shift register 37. It can appreciated from FIG. 4 that the last 16 bits to be entered into the serial in, serial out shift register 37 are the same bits that appear in the 16 bit serial in parallel out shift register 47. In addition, it will be apparent that the last 16 bits passed by the serial in, serial out shift register 37 to the serial in, serial out shift register 39, and which therefore, appear in the first 16 bits of the register 39, are the same bits that appear in the 16 bit serial in parallel out shift register 49. Similarly, the first 16 bits in the serial in, serial out shift registers 41, 43 and 45 are the same bits that appear in the 16-bit serial in, parallel out shift registers 51, 53 and 55. The last 16-bits to be outputted by the last serial in, serial out shift register 45 appear in the serial in parallel out shift register 57. Thus, it can be seen that the serially connected serial, in serial out shift registers provide to the serial in, parallel out shift registers, 16-bit portions of the serial bit stream spaced a frame apart. In total, the most recent bits spanned by two channels in 6 frames are continuously retained. At the same time, the 16-bit serial, in parallel out shift registers are storing two adjacent channel length sections of the bit stream for six successive frames.

The first eight bits, or byte, of parallel output from the 16-bit serial in, parallel out shift register 57 (containing the oldest data) are applied to a programmable read-only memory (PROM) 59, and the last eight bits are applied to a separate PROM 61. Similarly, the first eight parallel outputs of the serial in, parallel out shift register 55 are connected to PROM 63 and the last eight bits are connected to a PROM 65. For the serial in, parallel out shift registers 53, 51, 49 and 47 only the first eight parallel bits are connected to PROMS 67, 69, 71 and 73 respectively.

Periodically the sections of the received serial bit streams stored in the serial in, parallel out shift registers will correspond to channels 1 and 2 of the serial bit stream of the transmitted serial bit stream. This will occur at points separated by 193 bits in the transmitted signal. On every six of those occasions, channel 1 and 2 data from the first of the six encoded frames will be stored in the serial in, parallel out shift register 57. Simultaneously, data from channels 1 and 2 in the successive frames 2 through 6 will be found in the serial in, parallel out shift registers 55, 53, 51, 49 and 47 respectively. Thus at this point, the right hand side of the shift register 57 will contain the bits of the serial bit stream encoded with the signal S1 and the left hand side will contain the bits encoded with signal S2. Similarly shift register 55, and the right hand side of shift registers 53, 51, 49 and 47 will contain the bits from the transmitted bit stream corresponding to the portions of the bit stream encoded with the other synchronizing signals.

The signals stored at any one time in the serial in, parallel out shift registers are compared with values of the sequence of uniquely encoded signals S1 to S8 stored in the PROMS. The PROMS 59 to 73 are addressable memories. The associated eight bit parallel output from the associated serial in, parallel out shift register is applied to the PROM as an address. Each of the PROMS has stored in an address corresponding to the uniquely encoded signal assigned to that PROM a signal indicating a match. The other addresses in the PROM store signals indicating no match. Thus, if the signal stored in the associated section of the serial in, parallel out shift register corresponds to the address representing the uniquely encoded signal assigned to that PROM, the PROM will generate an output indicating a match on a lead 75. Each of the leads 75 is applied to an AND gate 77 which generates a synchronization signal when each of the PROMS generates a match signal. This will only occur, and thus a match signal will only be generated, for that portion of the bit stream in which channel 1 and 2 are stored in the serial in parallel out shift registers with the repetitive frames in order beginning with the first such repetitive frame in the shift register 57.

It can be appreciated that when the serial bit stream is so aligned in the serial in parallel out shift registers, that the redundant data entries in frames 3 and 4 of channel 2 will be stored in the second half of the serial in parallel out shift registers 53 and 51 repetitively. Similarly, the parity check signals P1 and P2 for the redundant data signals D1 and D2, will be stored in the second half of the serial in parallel out shift registers 49 and 47 respectively at this time. Thus, upon generation of the synchronization signal, a microprocessor 78 extracts the data and parity signals from the digital bit stream by outputting the bits stored in the serial in, parallel out shift registers 53, 51, 49 and 47. The microprocessor 78 verifies and corrects the data, as mentioned above, prior to passing it on the protection processor 23.

As discussed, the six successively encoded frames repeat every 750 microseconds, hence it can be seen that resynchronization can be accomplished much more rapidly than with the convention T1 format.

With the long sequence of equally encoded synchronizing signals provided in accordance with the invention, it is highly unlikely that a false synchronization would occur. To estimate the probability of such a false detection, we can assume that all the data is random. Six frames contain 1158 bits, and we will assume that each bit position represents a possible starting position for a false sequence. Since there are two 16-bit sequences (frames 1 and 2) followed by four eight bit sequences (frames 3–6), the probability that this whole sequence is a false detection is:

$$\begin{aligned} P \text{ (false sync)} &= 1{,}158 \times 2^{-16} \times 2^{-16} \times \\ &\quad 2^{-8} \times 2^{-8} \times 2^{-8} \times 2^{-8} \\ &= 1{,}158 \times 2^{-64} \\ &= 6.27 \times 10^{-17} \\ &= 1/1.6 \times 10^{16} \end{aligned}$$

Since each message block, that is six frames, last for 0.75 milliseconds, the average time interval between the occurrence of such a full false sequence is:

$$\begin{aligned} T \text{ (false sequence)} &= 0.75 \times 10^3 \times 1\, 1.6 \times 10^{16} \\ &= 1.2 \times 10^{13} \\ &= 380 \times 10^3 \text{ years} \end{aligned}$$

The expectation is that in practice, there will be no false synchronization. The time for synchronization should always be less than the specified 2 milliseconds.

In a fiber optic T1 length, it is expected that the bit error rate will be approximately $10^{-9}$. The probability of n bit errors in N bytes of data is given by:

$$P_N(n) = \binom{8N}{n} \times 10^{-9n} \times (1 - 10^{-9})^{(8N-n)}$$

$$\text{where } \binom{8N}{n} = \frac{8N!}{n!\,(8N - n)!}.$$

The probabilities for several values of n (errors) in N (bytes) are listed in the following table.

| | Errors at $10^{-9}$ bit-error rate | | |
|---|---|---|---|
| N bytes | 1 error | 2 errors | 3 errors |
| 1 | $8 \times 10^{-9}$ | $2.8 \times 10^{-17}$ | $5.6 \times 10^{-26}$ |
| 2 | $1.6 \times 10^{-8}$ | $1.2 \times 10^{-16}$ | $5.6 \times 10^{-25}$ |
| 4 | $3.2 \times 10^{-8}$ | $5.0 \times 10^{-16}$ | $5.0 \times 10^{-24}$ |
| 8 | $6.4 \times 10^{-8}$ | $2.0 \times 10^{-15}$ | $4.2 \times 10^{-23}$ |

We can infer from these probabilities that the chance of encountering more than a single bit error during a re-synchronization is extremely remote. From the table, the probability of two bit-errors in the eight synchronization bytes is $2.0 \times 10^{-15}$. The eight bytes are encoded into six T1 frames, and therefor occur at 0.75 milliseconds intervals. The average time interval between successive double errors is given by:

$$\begin{aligned} T(2 \text{ errors}) &= 0.75 \times 10^{-3}/2.0 \times 10^{-15} \\ &= 3.8 \times 10^{11} \text{ seconds} \\ &= 11.9 \times 10^3 \text{ years} \end{aligned}$$

Single errors are much more likely to occur:

$$\begin{aligned} T(1 \text{ error}) &= 0.75 \times 10^{-3}/6.4 \times 10^{-8} \\ &= 1.2 \times 10^4 \text{ seconds} \\ &= 3.3 \text{ hours} \end{aligned}$$

However, most single errors will occur while the decoder is properly synchronized and not during an actual re-synchronization. Assume, for example, that it is necessary to re-synchronize the decoder once every minute. Then the average time interval between errors occurring during re-syncronization is:

$$T(1 \text{ error/re-sync}) = 1/6.4 \times 10^{-8} \text{ minutes}$$
$$= 29.7 \text{ years}$$

We can conclude that the decoder must be capable of tracking the synchronization code, that is, staying in synchronism, during the occurrence of single bit errors, but that re-synchronizing in the presence of errors is not absolutely essential. The ability to re-synchronize in the presence of errors would, however, permit somewhat higher bit-error rates.

Permitting errors during re-synchronizing is effectively the same as decreasing the length of the synchronizing sequence. Since, as we have seen, an eight byte sequence yields a false synchronization sequence at a rate of one per 380,000 years, one error could be permitted in each of the sequences S1S2, S3S4, S5, S6, S7 and S8 without significantly affecting the performance.

Permitting errors in the synchronization signals can be accommodated by storing a match signal in addresses in the PROMs corresponding to each of the possible errors in the associated uniquely coded signal. Preferably, no errors would be allowed during synchronization, but once synchronization was achieved, one or even more, errors could be permitted during tracking of the synchronization code. Each of the additional errors permitted would have to be coded as an address in the PROMs.

Figure 6:
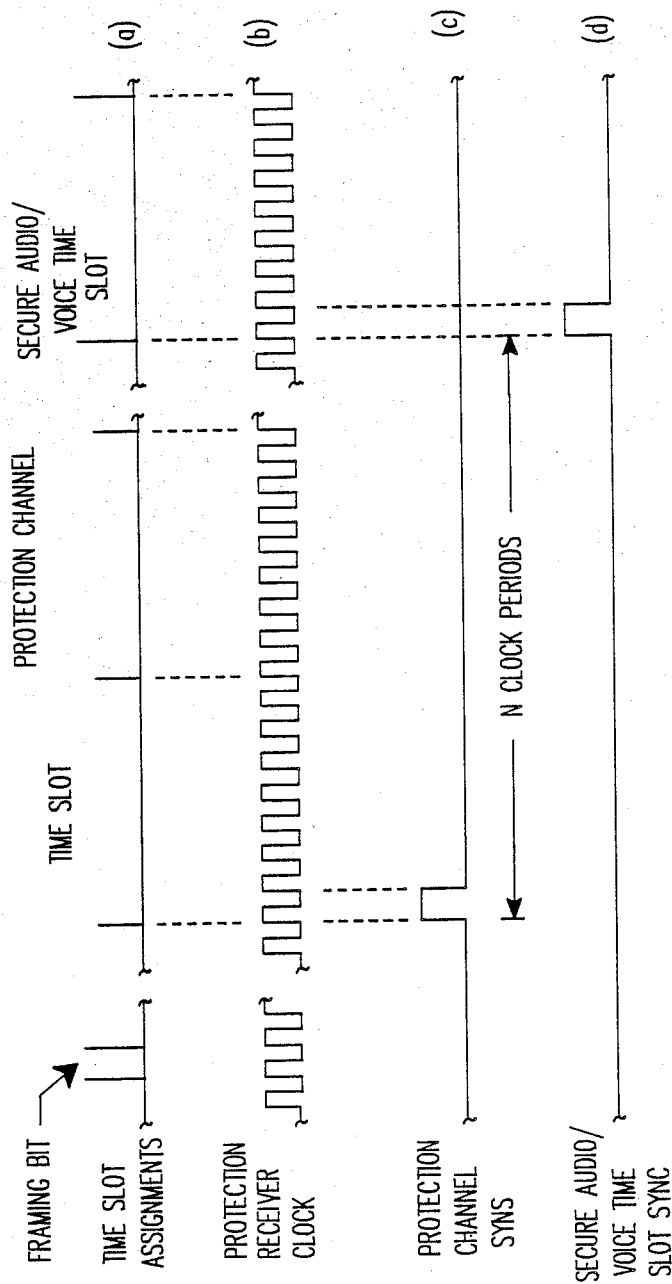
FIG. 6 is a timing diagram for the modification of the invention shown in FIG. 6.

FIG. 6 illustrates a modification to the system of FIG. 2 to provide the rapid synchronization and secured digital communications achieved in the protection channel for the voice and data channels. In this embodiment of the invention, the conventional T1 receiver 31 used for the voice and data channels is replaced by a conventional CODEC (coder/decoder) device 81 which receives the transmitted serial bit stream through the protection receiver 33 on a lead 83, and a clock pulse also received from the protection receiver on a lead 85. The CODEC 81 also receives a signal from a counter 87 which is preloaded by the channel synchronization signal from the protection receiver received on lead 89. The counter is preloaded with a count representing the number of bits in the transmitted serial bit stream between the point in the bit stream at which the protection system synchronization signal is generated, and that at which any time slot other than the protection time slots begins. The CODEC 81 uses the output of this counter to convert the digital serial data in the specified channel into an analog voice channel or data channel output. This arrangement bypasses the conventional voice channel or data channel framing process and utilizes the protection receivers' capability to rapidly re-synchronize and tolerate noisy data channels.

The manner in which the circuit of FIG. 6 operates is illustrated in the timing diagram shown in FIG. 7. Trace (a) illustrates the T1 time slot assignments. Trace (b) represents the protection receiver clock pulses, while trace (c) illustrates the protection channel synchronization signal. The preloaded counter 87 counts the N clock periods from the protection channel synchronization pulse to generate the voice/data time slot synchronization pulse shown in trace (d) which is used by the CODEC 81 to decode the voice and data channels.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A secure multichannel digital communications system comprising:
    means for time multiplexing a plurality of channels to form a serial bit stream comprising successive frames with each frame containing a fixed number of bits from each of said channels, and for encoding said serial bit stream by repetitively inserting in the fixed number of bits for a selected channel in each of n successive frames, one of a sequence of separate uniquely coded signals of said fixed number of bits;
    means for transmitting the encoded serial bit stream to a remote location;
    means for receiving said encoded serial bit stream at the remote location;
    means for continuously retaining the most recent bits of said serial bit stream received by the receiving means equal in number to the number of bits spanned by the selected channel in said n frames;
    means for comparing sequential fixed number of bit length portions of the retained bit stream spaced apart by the length of a frame with stored values of said sequence of separate uniquely coded signals, and for generating a match signal when the sequential fixed number of bit length portions have a selected match with said stored values of said sequence of separate uniquely coded signals; and
    means responsive to said match signal for demultiplexing said multichannel signal.

2. The system of claim 1 wherein said means for continuously retaining the most recent bits of said serial bit stream comprises a series of serially connected serial in serial out shift registers; and
    wherein said means for comparing said sequential fixed number of bit length portions of the retained bit stream with said sequence of uniquely coded signals comprises a number of serial in and parallel out shift registers, means for entering specified bits from locations in said series of serially connected serial in serial out shift registers spaced apart by the number of bits in a frame into separate ones of said serial in parallel out shift registers, and comparison means for comparing the parallel outputs of each of said serial in parallel out shift registers with a corresponding one of said stored values of said sequence of uniquely coded signals.

3. The system of claim 2 wherein the comparison means comprises programmable memory means programmed with addresses corresponding to each uniquely coded signal, and means for applying the parallel outputs of said serial in parallel out shift registers to said programmable memory means as addresses, said programmable addresses each containing a stored signal representative of a match between a fixed number of bit length portion of the bit stream in the associated serial in parallel out shift register and a uniquely coded signal.

4. The system of claim 2 wherein said means for time multiplexing includes means for uniquely encoding at least two channels in each frame of said serial bit stream and wherein said serial in parallel out shift registers include means for receiving bits of both encoded channels and wherein said means for entering bits into said serial in parallel out shift registers includes means for entering bits from the serial in serial out shift registers spaced in said received serial bit stream by the amount between the selected channels.

5. The system of claim 2 including n minus 1 serial in serial out shift registers and n serial in, parallel out shift registers and wherein the means for entering said specified bits into said serial in, parallel out shift registers includes means connecting the output of each serial in, serial out shift register to the input of one of the serial in, parallel out shift registers, and means applying the bit stream applied to the input of the first serial in, serial out shift register in the series to the remaining serial in, parallel out shift register.

6. The system of claim 5 wherein said means for time multiplexing includes means for uniquely encoding at least two contiguous channels in n frames of said serial bit stream, and wherein said serial in, parallel out shift registers include sufficient bits for retaining the bits associated with the two contiguous channels, and wherein said comparison means includes means for comparing the parallel output of the portions of each serial in, parallel out shift register associated with a given channel with an associated uniquely coded signal.

7. The system of claim 6 wherein said comparison means comprises a programmable memory associated with each uniquely coded signal, with each such programmable memory programmed with an address corresponding to the associated uniquely coded signal, and means for applying the parallel outputs of said serial in, parallel out shift registers associated with a uniquely coded signal to the associated programmable memory as an address, said program addresses containing stored signals representative of a match between the parallel outputs of the portions of the serial in, parallel out shift registers associated with a given channel and the associated uniquely coded signal.

8. The system of claim 1 wherein said means for multiplexing includes means for repetitively encoding only some of said n successive frames of a second channel of said serial bit stream with a sequence of uniquely coded signals and entering data into the remaining of said n successive frames of said second channel; wherein said means for comparing includes means for comparing with stored values of said sequence of uniquely coded signals corresponding fixed number of bit length portions of the retained bit stream spaced apart by the number of bits between the successive uniquely coded frames of the two selected channels, and for generating a synchronization signal when the corresponding fixed number of bits length portions of the uniquely coded frames of the selected channel have a selected match with said stored valves of said separate uniquely coded signals; and wherein said demultiplexing means includes means responsive to the synchronization signal for extracting said data from the retained bit stream at locations corresponding to the frames of the second selected channel containing data.

9. The system of claim 8 wherein said means for continuously retaining the most recent bits of said serial bit stream comprises a number of serially connected serial in, serial out shift registers; and wherein said means for comparing include a number of serial in and parallel out shift registers, means for entering said corresponding fixed number of bit length portions of the bit stream in the serial in, serial out shift registers into said serial in, parallel out shift registers, and comparison means for comparing the parallel output of said serial in, parallel out shift registers with said uniquely coded signals.

10. The system of claim 9 wherein said comparison means comprises programmable memory means programmed with addresses corresponding to each of the uniquely coded signals, and means for applying the parallel output of said serial in, parallel out shift registers associated with uniquely coded signals to the programmable memory means as an address, said programmed addresses containing stored signals representative of a match between the parallel outputs of the portions of the serial in parallel out shift registers associated with a given channel and frame and the associated uniquely coded signal.

11. The system of claim 10 wherein said means for time multiplexing includes means for encoding two contiguous channels; wherein said number of serial in, serial out shift registers is equal to n minus 1 such shift registers each having a number of bits equal to the number of bits in a frame, wherein the number of serial in, parallel out shift registers is equal to n such shift registers each having means for receiving bits of two contiguous channels, and wherein said means for entering said corresponding fixed number of bit length portions of the bit stream in the serial in, serial out shift registers into said serial in, parallel out shift registers includes means connecting the output of each serial in, serial out shift register to the input of one of the serial in, parallel out shift registers and means applying the bit stream applied to the input of the first serial in, serial out shift register in the series to the remaining serial in, parallel out shift register.

12. The system of claim 11 wherein the means for extracting data from said serial bit stream comprises means for reading the parallel outputs of portions of the serial in parallel out shift registers corresponding to the frames of said second selected channel containing data.

13. The system of claim 12 wherein said multiplexing means enters redundant data signals into selected frames of said second selected channel, and wherein said demultiplexing means includes means to extract the redundant values of the data signals from the received bit stream, said system further including processor means to compare said redundant data signals.

14. A secure multichannel digital protective relaying system comprising:
means for time multiplexing a plurality of channels to form a serial bit stream comprising successive frames with each frame containing a fixed number of bits from each of said channels, and for encoding said serial bit stream by repetitively inserting in the fixed number of bits for a selected channel in at least one of n successive frames, relaying data and inserting in the fixed number of bits for said selected channel each of the remaining of said n frames, one of a sequence of uniquely coded signals;
means for transmitting the encoded serial bit stream to a remote location;
means for receiving said encoded serial bit stream at the remote location;
means for continuously retaining the most recent bits of said serial bit stream received by the receiving means equal in number to the number of bits spanned by the selected channel in said n frames;

means for comparing sequential fixed number of bit length portions of the retained bit stream spaced apart by the number of bits between the frames of the encoded bit stream with stored values of said sequence of uniquely coded signals, and for generating a synchronization signal when the sequential fixed number of bit length portions have a selected match with said stored values of said sequence of separate uniquely coded signals; and means responsive to said synchronization signal for extracting from said retained bit stream the fixed number of bit length portion corresponding to the location in each frame of said selected channel encoded with said relay data.

15. The system of claim 14 wherein said multiplexing means includes means for repetitively encoding n successive frames of a second channel of said serial bit stream with additional signals in said sequence of uniquely coded signals; wherein said means for continuously retaining the most recent bits of said serial bit stream received by the receiving means include means for retaining the most recent bits equal in number to the number of bits spanned by said selected channel and said second channel in said n frames; wherein said means for comparing includes the means for comparing fixed number of bit length portions of the received bit stream corresponding to the location of said second channel therein relative to said selected channel, and for generating a synchronization signal when the corresponding fixed number of bit length portions of both the uniquely coded frames of the selected channel and of the second channel have a selected match with said stored values.

16. The system of claim 14 wherein said means for multiplexing includes means for repetitively inserting in a second of said n successive frames, fixed number of bit length check data for the relaying data in said one frame, and wherein said means for extracting data includes means for extracting said check data from said second of said n frames of said selected channel.

17. The system of claim 14 wherein said means for multiplexing includes means for repetitively inserting in said at least one and in a second of said n frames of said selected channel redundant relaying data; and wherein said means for extracting includes means for extracting the redundant relaying data from said at least one and said second of said n frames of said selected channel.

18. The system of claim 17 wherein said multiplexing means further includes means for repetitively inserting in third and fourth of said n frames of said selected channel check data for said redundant relaying data in said one and second frames respectively; and wherein said means for extracting includes means for extracting said check data from said third and fourth of said n frames of the selected channel.

19. The system of claim 14 wherein said multiplexing means includes means for repetitively inserting data in at least one other channel of said multichannel bit stream and including means responsive to a synchronization signal for counting the number of bits in the received serial bit stream and for generating a time slot synchronization signal when the count equals the number of bits between the point in the bit stream at which said match signal is generated and the beginning of said other channel, and means responsive to the time slot synchronization signal for extracting data in said other channel from the received bit stream.

20. A method of synchronizing a multichannel time multiplexed digital signal in which a serial bit stream is divided into frames each including a data byte from each channel, said method comprising the steps of:

encoding said serial bit stream by repetitively inserting data in the byte for a selected channel in at least one of n successive frames, and inserting in each of the remaining of said n frames, one of a sequence of byte length uniquely coded signals;

transmitting the encoded serial bit stream to a remote location;

receiving said encoded serial bit stream at the remote location;

continuously retaining the most recent bits of the received serial bit stream equal in number to the number of bits spanned by the selected channel in said n frames;

comparing specified sequential byte length portions of the retained bit stream spaced apart by the number of bits between the uniquely frames of the encoded bit stream encoded with said sequence of said uniquely coded signals;

generating a synchronization signal when the specified sequential byte length portions have a selected match with said sequence of uniquely coded signals;

identifying in response to said synchronization signal the byte length portions of the retained bit stream corresponding to said one frame of the selected channel; and extracting said data from the identified byte length portions of the retained bit stream corresponding to said one frame of the selected channel.

21. The method of claim 20 wherein said multiplexing step includes entering into a another of said n frames of the selected channel check signals for said data, wherein said identifying step further includes identifying in response to said synchronization signal, the byte length portions of the retained bit stream corresponding to said another frame of the selected channel and wherein said extracting step includes extracting the check signals from the identified byte length portions of the retained bit stream corresponding to said another channel.

22. The method of claim 20 wherein said multiplexing step includes entering into a second of said n frames of the selected channel redundant data, wherein said identifying step further includes identifying in response to said synchronization signal, the byte length portions of the retained bit stream corresponding to said second frame of the selected channel and wherein said extracting step includes extracting the redundant data from the identified byte length portions of the retained bit stream corresponding to said second frame of said selected channel.

23. The method of claim 22 wherein said multiplexing step further includes entering into third and fourth frames of said n frames of the selected channel, check signals for the data in said one and second frames respectively, wherein said identifying step further includes identifying in response to said match signal, the byte length portions of the retained bit stream corresponding to said third and fourth frame of the selected channel, and wherein said extracting step includes extracting the check signals from the identified byte length portions of the retained bit stream corresponding to said third and fourth frames of said selected channel.

24. The method of claim 20 wherein the multiplexing step includes repetitively inserting data in at least one other channel of said multichannel bit stream and further including the steps of counting the number of bits in the received serial bit stream and for generating a time slot synchronization signal when the count equals the number of bits between the point in the bit stream at which the synchronization signal is generated and the beginning of said other channel and in response to said time slot synchronization signal extracting data in said other channel from the received bit stream.

25. The method of claim 20 wherein said multiplexing step includes repetitively uniquely encoding each of n successive frames of a second channel of said multichannel signal with said sequence of said separate uniquely coded signals, wherein the retaining step includes retaining the most recent bits of the received serial bit stream equal in number to the number of bits spanned by the selected channel and the second channel in said n frames; wherein said comparing specified sequential byte length portions of the retained bit stream includes comparing specified sequential byte length portions of the bit stream spaced apart by the number of bits between the frames of the second channel with said sequence of uniquely coded signals; and wherein the generating step includes generating a synchronization signal when the specified sequential byte length portions for both the selected channel and said second channel have a selected match with said sequence of uniquely coded signals.

26. The method of claim 25 wherein the multiplexing step includes repetitively inserting data in at least one other channel of said multichannel bit stream and further including the steps of counting the number of bits in the received serial bit stream and for generating a time slot synchronization signal when the count equals the number of bits between the point in the bit stream at which the synchronization signal is generated and the beginning of said other channel and in response to said time slot synchronization signal extracting data in said other channel from the received bit stream.

27. The method of claim 20 wherein said step of generating a synchronization signal includes generating said synchronization signal in response to a first selected match between the specified sequential byte length portions of the retained bit stream and said sequence of uniquely code signals for an initial match and generating said synchronization signal in response to a second selected match therebetween following said initial match.

28. The method of claim 27 wherein for said first selected match each bit of each sequential byte length portion of the bit stream equals the corresponding bit of the corresponding one of said sequence of uniquely encoded signals and for said second selected match at least a specified number of bits of each of said sequential byte length portions of the retained bit stream equal the corresponding bits of the corresponding uniquely coded signal.

* * * * *